United States Patent

Koch et al.

[15] 3,699,754
[45] Oct. 24, 1972

[54] CONDITIONER MOUNTING FOR A WINDROWER

[72] Inventors: Earl E. Koch, Mohnton, Pa.; Joe E. Shriver, Lebanon, Ohio

[73] Assignee: Sperry Rand Corporation, New Holland, Pa.

[22] Filed: May 28, 1971

[21] Appl. No.: 148,044

[52] U.S. Cl. ............................. 56/15.8, 56/DIG. 1
[51] Int. Cl. ......................................... A01d 47/00
[58] Field of Search ........ 56/DIG. 1, 10.2, 10.4, 14.4, 56/15.8

[56] References Cited

UNITED STATES PATENTS 3,306,014   2/1967   Halls et al. ............ 56/DIG. 1 X
3,473,305  10/1969   Cyr ....................... 56/DIG. 1 X Primary Examiner—Louis G. Mancene
Assistant Examiner—J. N. Eskovitz
Attorney—John C. Thompson, Joseph A. Brown, George C. Bower, Larry L. Coats and James J. Kennedy

[57] ABSTRACT

A conditioning unit adapted for mounting beneath the main frame of a windrower having a front mounted header pivotally connected thereto by a lift mechanism including a pair of laterally spaced lower lift arms. The conditioning unit is pivotally mounted about the rear thereof to the main frame of the windrower and includes a pair of rollers rotatively mounted about front outside portions, the rollers being laterally spaced and adapted to rest upon the lower left arms such that the conditioning unit moves proportionally to the movement of the header.

9 Claims, 6 Drawing Figures

INVENTOR.
EARL E. KOCH
JOE E. SHRIVER
BY
Larry L. Coats
ATTORNEY

3,699,754

CONDITIONER MOUNTING FOR A WINDROWER

BACKGROUND OF THE INVENTION

This invention relates to agricultural machinery and more particularly to a windrowing device having crop conditioning means attached thereto.

A windrower is an agricultural machine having a main frame with a header pivotally supported forwardly thereof by a lift mechanism. The header normally comprises a reel, a cutting mechanism, a centrally disposed discharge opening and an auger spaced rearwardly of the reel and cutting mechanism and adapted to consolidate the crop inwardly toward the discharge opening where the cut crop material is deposited on the ground in a windrow. Most lift mechanisms connecting the main frame of the windrower and the header are provided with means to allow the header to float as it moves over undulations in the ground.

In some types of crops it becomes desireable to condition the crop as it is deposited in the windrow. To accomplish this a conditioning unit may be pivotally mounted beneath the main frame of the windrower, rearwardly of the header. Since most headers are adapted to float over ground undulations, it is desirable to provide a mounting structure for the conditioning unit to allow it to undulate with the header such that the front portion of the conditioning unit is always in close proximity to the discharge opening of the header.

By maintaining the conditioning unit close to the header discharge opening waste is averted as the rearward moving crop material is less likely to fall between the discharge opening and the conditioning unit. Also it is desirable to provide the conditioning unit with a mounting structure that enables the conditioning unit to be raised to a relatively high position with respect to the ground when the header is raised to its transport position.

To accomplish these two basic goals for mounting the conditioning unit it is desirable to provide a mounting structure that cooperates with the header lift mechanism. One such reference teaching a mounting structure for a conditioning unit that cooperates with the lift mechanism is the patent to L. M. Halls et al., U. S. Pat. No. 3,324,639. The Halls patent shows a conditioning unit pivotally connected about a rear transverse axis to the main frame of a windrower and further including a pair of springs resiliently connecting the front portion of the conditioner unit to a pair of upper lift arms of the lift mechanism. Therefore as the header floats, the springs tend to move the conditioning unit up and down in such a manner that the conditioning unit tends to stay relatively close to the discharge opening of the header. By using a spring connection the movement of the conditioning unit is not necessarily proportional to the movement of the header and, in fact, the resilient nature of the springs tends to cause the header unit to oscillate up and down, sometimes resulting in poor crop feeding to the conditioning unit.

SUMMARY OF THE INVENTION

Applicants' invention is an improved mounting structure for a conditioning unit to be mounted beneath the main frame of a windrower, rearwardly of a front pivotally mounted header. The conditioning unit is pivotally mounted about a rear-transverse axis by a pair of brackets depending downwardly from the main frame of the windrower. The conditioning unit is further provided with a pair of rollers, each roller rotatively mounted on a front outside portion of the conditioning unit and adapted to align and rest upon a pair of lower lift arms or links that extend between the main frame of the windrower and the header. Thus as the header floats up and down the lower lift links upon which the rollers move causes the conditioning unit to move in proportion to the movement of the header.

It is therefore the principle object of the present invention to provide a mounting structure for a conditioning unit to be mounted beneath the main frame of a windrower with mounting means such that the conditioning unit moves in proportion to the movement of the windrower header as the header moves over undulations in the ground.

Another object of the present invention is to provide the conditioning unit with a pair of rollers, each roller disposed on a front outside portion of the conditioning unit and to provide a header lift mechanism with a pair of guide rails adapted to support the rollers such that movement of the lift mechanism will result in proportional movement of the conditioning unit.

Another object of the present invention is to provide the header with a centrally disposed discharge opening having a floor plate pivotally connected about the lower portion thereof and extending rearwardly therefrom and terminating in spaced apart relationship relative to the front of the conditioning unit.

It is a further object of the present invention to provide the floor plate with a transverse bar which is fixed to the bottom of the floor plate and overlies and upper surface of the lower lift links of the lift mechanism such that the floor plate is articulated up and down in response to the movement of the lift links.

It is a particular object of the present invention to provide a pair of guide rails inwardly disposed along the sides of the lower lift links and adapted to support the rollers mounted on the front outside portions of the conditioning unit.

It is another object of the present invention to provide the guide rails with an elevated cam surface spaced so as to engage the rollers when the header is positioned in the transport position such that the conditioning unit is elevated to a desirable height above the ground.

A more particular object of the present invention is to provide the cam surface with a shape and configuration designed to support a substantial portion of the conditioner's weight when the header is in the transport position, thereby relieving a significant load and the forces associated therewith that would otherwise be borne by the rear mounting structure.

Other objects and advantages of the present invention will become apparent and obvious from a study of the following description and the accompanying drawings which are merely illustrative of the present invention.

DESCRIPTION OF THE PREFERRED EMBODIMENT

Figure 1:
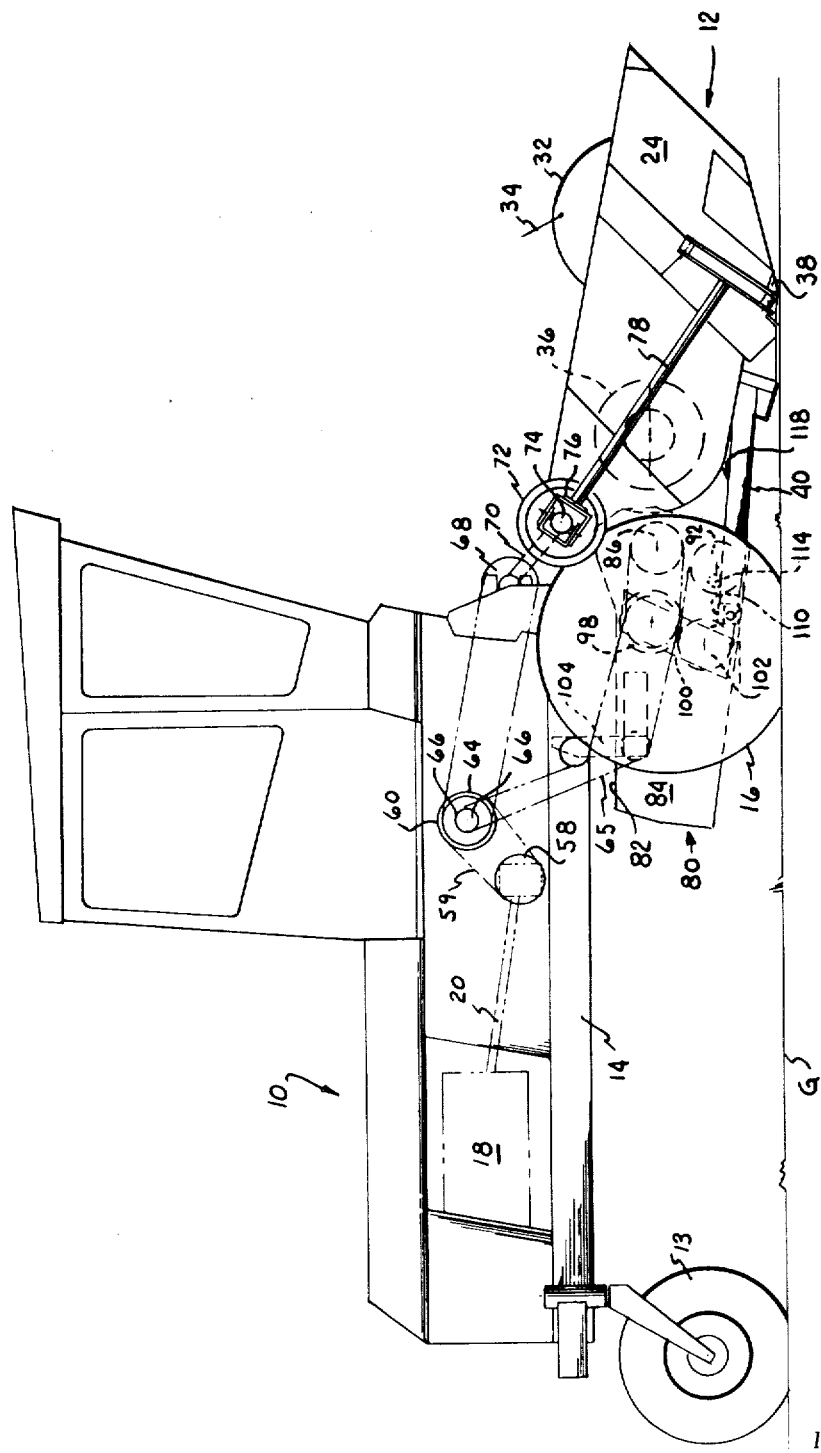
FIG. 1 is a side elevational view of a windrower having a conditioning unit mounted therebeneath in accordance with the present invention.

With reference to the drawings, particularly FIG. 1, a windrower indicated by the numeral 10 is shown therein and includes a front pivotally mounted header 12. The windrower 10 has a rectangular main frame 14 with a pair of laterally spaced rear castor-type wheels 13 depending from the rear end thereof. Depending from the front portion of the main frame 14 is a pair of laterally spaced front wheel gear housings 15, each gear housing having a front wheel 16 rotatively mounted on the outside thereof. The windrower 10 further includes a power source 18 mounted about the rear thereof and having a main drive shaft 20 operatively connected to the forward portion thereof and extending forwardly therefrom to a front mounted gearbox 22. Gearbox 22 is adapted to transfer the rotational torque of the power source 18 to a transversely extending jack shaft 62.

Figure 3:
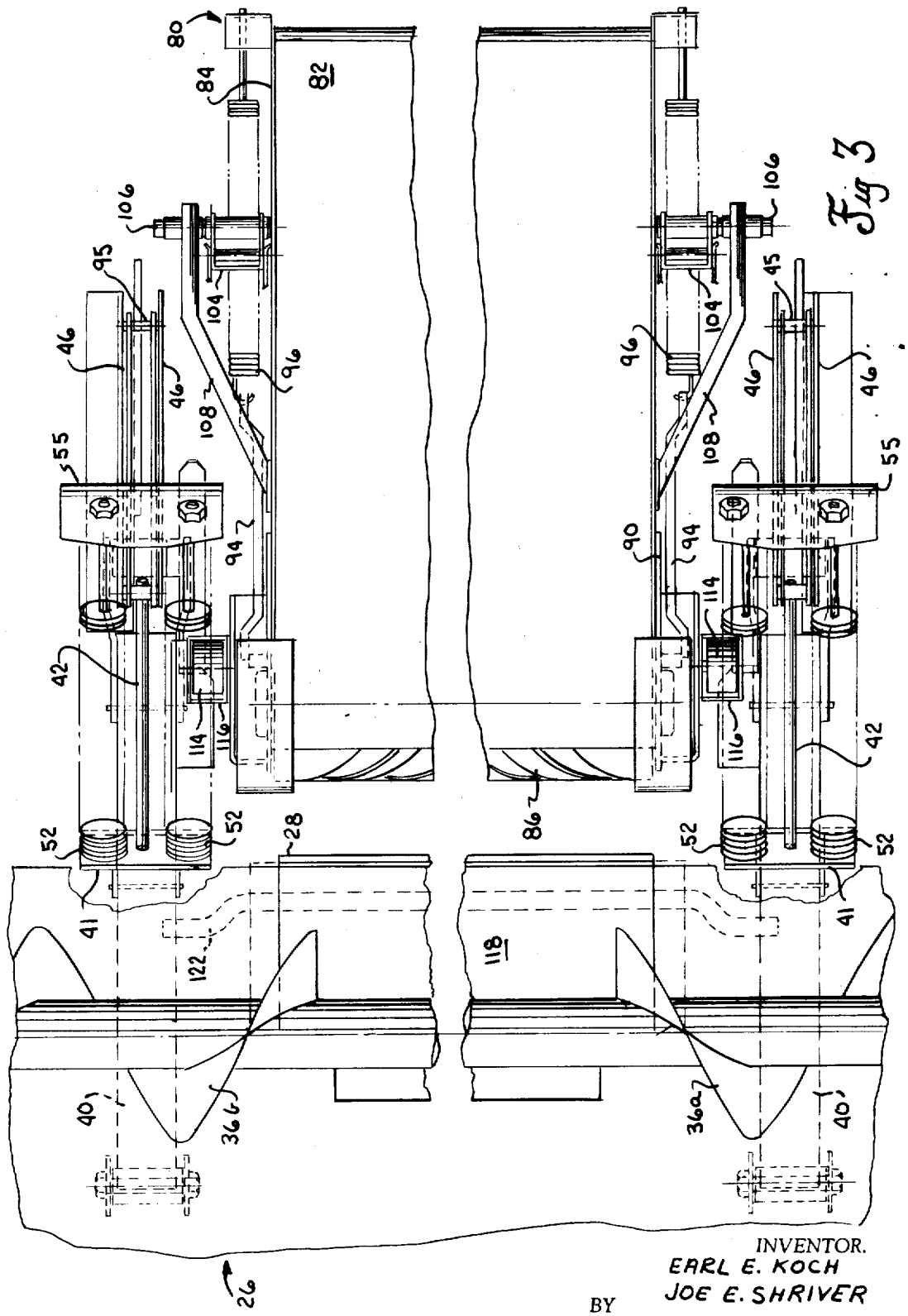
FIG. 3 is a plan view taken through the line 3—3 of FIG. 1.

The header 12 includes a pair of vertical side sheets 24 and a floor 26 (FIG. 3) extending laterally therebetween. Centrally disposed in a rear portion of floor 26 is a generally rectangular discharge opening 28. As will be subsequently described in greater detail the header is adapted for floatation, and to initiate such flotation the header 12 is provided with a pair of ground engaging skid shoes 30 fixed to the lower outside portions thereof. Rotatively mounted forwardly within the side sheets 24 is a reel 32 adapted to engage the oncoming crop and sweep it rearwardly over a transversely extending cutterbar assembly 38 spaced below the reel just above ground level G. The reel 32 is further provided with a series of tines 34 laterally spaced about the periphery thereof. Disposed behind the reel is a transversely extending auger 36, the auger including first and second inwardly extending flight sections indicated by the numerals 36a and 36b respectively. The auger is adapted to receive the cut crop, consolidate it and discharge it into the discharge opening 28.

Figure 2:
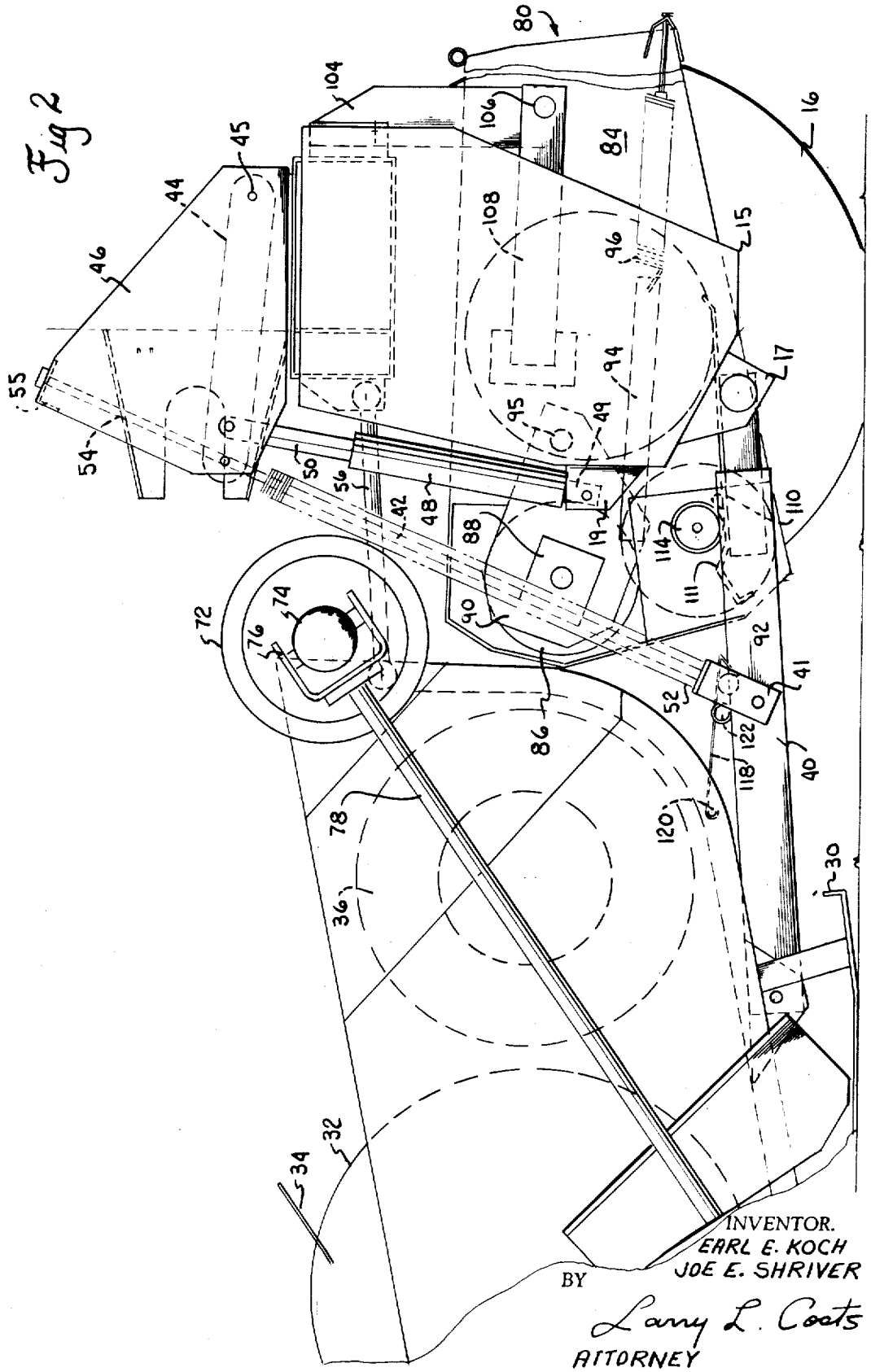
FIG. 2 is an enlarged fragmentary side elevational view of a front portion of the windrower, showing particularly the mounting structure of the conditioning unit.

Header 12 is pivotally mounted to the front portion of the windrower's main frame 14 by a combination lift mechanism, best shown in FIG. 2. The lift mechanism includes a pair of lower lift arms 40 laterally spaced apart and pivotally connected to a lower portion of the header and extending rearwardly therefrom to where they are pivotally connected to a pair of mounting brackets 17 which are fixed to the front wheel gear housings 15. Continuing with particular reference to FIG. 2, a pair of spaced apart plates indicated by the numeral 46 are fixed about each side of the main frame 14 just above the front wheel gear housing 15. Pivotally connected between each pair of plates 46 is an upper lift arm 44 which is pivotally mounted about a transverse axis 45. Each upper lift arm 44 is connected with a corresponding lower lift arm 40 by a connecting link 42, each connecting link 42 being fixed about its lower portion to a T-shaped bracket 41, which is pivotally connected to the lower lift link 40, and connected about its upper portion to the front end of upper lift arm 44. The upper lift arms 44 are articulated up and down by a pair of hydraulic cylinders 48, each cylinder having an anchor end 49 and a rod end 50. Each hydraulic cylinder 48 is anchored to a bracket 19 which extends forwardly from a corresponding gear housing 15. The rod ends 50 of cylinders 48 are connected to front portions of the upper lift arms 44. Thus by extending the rod end 50 of each hydraulic cylinder 48, the upper lift arms 44 are moved upwardly, causing the lower lift arms to lift the header correspondingly.

To facilitate flotation, the lift system is provided with a series of tensioning springs connected between the lower lift arms 40 and the mounting plates 46. In particular, each side of the header lift system is provided with a pair of coil springs 52, each spring disposed on one side of a connecting lift link 42 and extending from the T-shaped bracket 41 upwardly to a point near the lower edge of the mounting plates 46. The upper ends of the coil springs 52 are provided with a bolt assembly 54 which extends upwardly and attaches to a transverse bracket member 55. Therefore by adjusting the bolt assembly, the tensioning of the springs is varied, thereby providing different flotation characteristics for the lift system.

The lift system is further provided with a stabilizing bar 56, the stabilizing bar being centrally located and extending between the main frame 14 of the windrower 10 and an upper portion of the header 12.

Turning to FIG. 1 the conditioner drive and header drive is shown schematically therein. Specifically the longitudinal rotational torque of the main drive shaft 20 is translated 90 degrees by a gearbox 22 which drives a sheave 58 which in turn drives jack shaft 62 via a V-belt 59 and main drive sheave 60. The jack shaft 62 has fixed thereon a pair of laterally spaced sheaves 64,66. Sheave 64 drives a front mounted header drive sheave 68 which in turn drives a wobble drive via a PTO shaft 70. For a more unified understanding of the particular drive contemplated for the windrower of this invention, one is directed to U.S. Pat. No. 3,577,716 which shows a split sickle bar arrangement having a pair of drives extending from a header drive sheave toward each side of the header. Continuing with reference to FIG. 1, the sickle bar drive is that commonly referred to as a wobble drive and includes a flywheel 72 and a wobble shaft 74 extending outwardly therefrom. Mounted to the wobble shaft 74 is a yoke member 76 which is fixed to a downwardly extending shaft 78 which is operatively connected to the cutterbar assembly 38 for reciprocating the same in a back and forth transverse manner.

Figure 4:
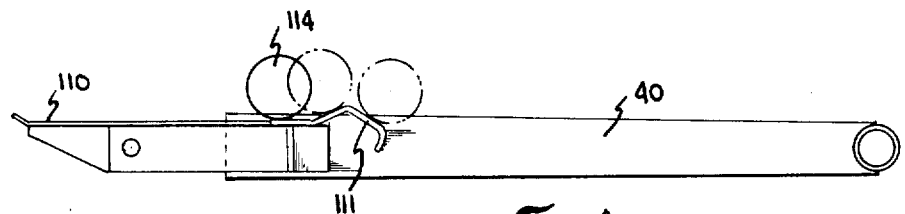
FIG. 4 is a side fragmentary view showing the front support structure for the conditioner mounting.

The present disclosure is provided with a conditioning unit indicated generally by the numeral 80, the conditioning unit being mounted between the front wheels 16 in an underslung fashion beneath the main frame 14 of the windrower 10. The conditioning unit shown in FIGS. 1, 2 and 4 generally includes a top portion 82 and a pair of downwardly depending sides 84. The rear of the conditioning unit is customarily provided with a deflector, not shown, which tends to fluff the rearwardly moving crop material and deposit it in a windrow. The conditioning unit 80 is normally mounted such that it is spaced in close proximity to the discharge opening 28 of the header.

Rotatively mounted about the front portion of the conditioning unit 80 is a pair of conditioning rolls indicated by numerals 86 and 92, the conditioning rolls being disposed one above the other in an intermeshed relationship. The upper conditioning roll 86 is rotatively mounted in a bearing assembly 88, the bearing assembly being mounted in a pivot arm 90 which is mounted to the conditioning unit for up and down pivotal motion about a transverse axis 95. Attached to the rear lower portion of the pivot arm 90 is a spring link 94 which is in turn connected to a tensioning spring 96 that is anchored to a lower rear portion of the conditioning unit.

Conditioning unit 80 is driven by sheave 66 which is fixed to an outer end of jack shaft 62. Sheave 66 is engaged with a belt 65 that drives an upper sheave 98 which in turn drives the upper conditioning roll 86. Also the upper drive sheave 98 is adapted to drive a gearbox 100 which in turn reverses the direction of rotation and drives the lower conditioning roll 92 via a lower drive sheave 102.

Figure 5:
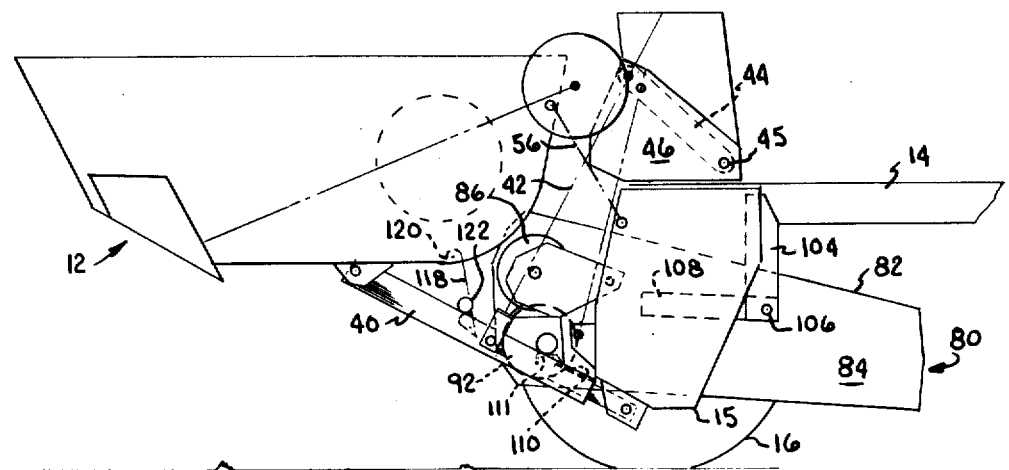
FIGS. 5 and 6 are schematic views illustrating the movement of the conditioning unit relative to the movement of the windrower's header.
Figure 6:
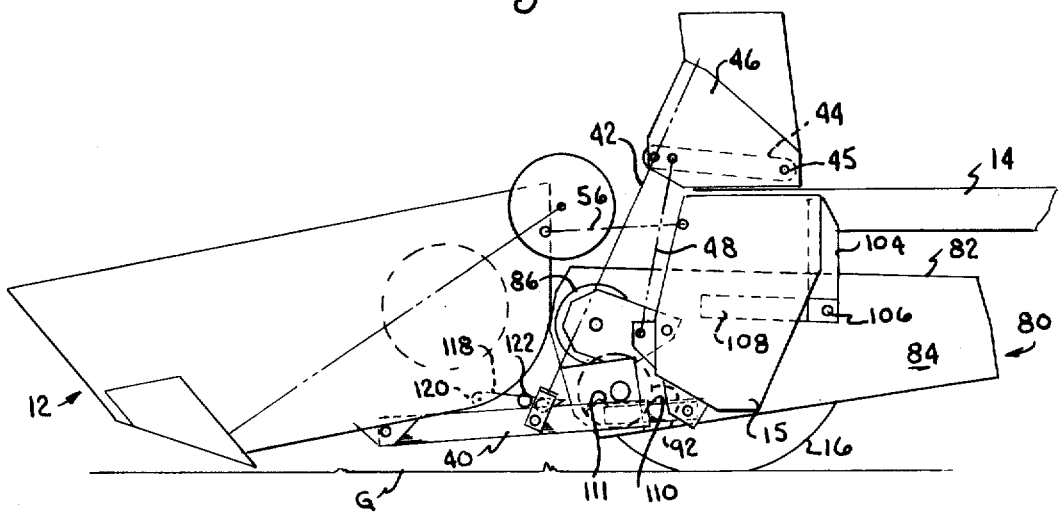

The conditioning unit 80 is pivotally mounted in an underslung fashion beneath the windrower's main frame 14 by a mounting structure that is cooperative with the lift system of the header such that the conditioning unit moves in response to the movement of the header. In particular, the conditioning unit 80 is pivotally mounted about a transverse axis 106 by a pair of laterally spaced rear mounting brackets 104 which are fixed to the main frame of the windrower 10 and depend downwardly therefrom where they are pivotally connected to a rear portion of the conditioner unit 80. This rear mounting structure is reinforced by a pair of braces 108, each fixed to a side 84 of the conditioning unit and extending rearwardly therefrom towards the rear where they support the rear transverse pivot axis 106. Each of the lower lift arms 40 is provided with a guide rail 110 which is formed along an inner side thereof and extends therealong for supporting a roller 114 which is rotatively mounted about a front outside portion of the conditioning unit by a mounting bracket 116. A cam surface 111 is provided about the forward end of the inner guide rails and particularly spaced such that as the lower lift arms 40 are elevated to raise the header to the transport position as shown in FIG. 5 the rollers 114 will move up the cam surface 111 and lift and conditioning unit to an elevation substantially above the ground G, thereby providing substantial clearance such that the windrower can be driven without a great risk of the conditioning unit engaging obstructions or foreign objects lying in its path. It is noted that the cam surface 111 is of an inverted V-shape and once the rollers 114 move forward past the apex thereof a substantial portion of the conditioner's weight is supported by the cam surface.

To provide a crop support for the cut crop moving between the header and the conditioning unit 80, a floor plate extension 118 is pivotally mounted at 120 to the lower portion of the discharge opening 28. The floor plate extension extends rearwardly from its pivot axis 120 and terminates in spaced apart relationship relative to the lower conditioning roll, the space between the rear terminal edge of the floor plate extension and the conditioning roll serving as a stone trap or a trap for other foreign objects that may be caught-up in the crop as it moves rearwardly towards the conditioning unit. Fixed to the lower rear portion of the floor plate extension is a transverse rod 122. The transverse rod 122 extends over the lower lift arms 40 and is slidable therealong as the lower lift arms 40 move up and down due to flotation of the header. Thus as the header 12 floats the lower lift arms 40 cause the floor plate extension 118 to move up and down in increments that correspond closely with the up and down movement of the conditioning unit 80.

In operation the cutterbar 38 cuts the oncoming crop as the windrower 10 moves through the field. The cut crop is swept rearwardly to the auger 36 by the reel 32. Then the cut crop is consolidated by the auger towards the central discharge opening 28 where the crop is propelled rearwardly therethrough over the floor plate extension 118 and on through the conditioning rolls 86,92 where the cut crop is conditioned and deposited in a windrow. As the header floats up and down and sideways over undulations within the ground G, the lift arms 40 move up and down and are in fact spring biased to move up by each pair of coil springs 52 which extend adjacent the connecting lift link 44. As the lift arms move up and down the rollers 114 ride up and down the inner guide rails 110, thereby raising and lowering the conditioning unit 80 in proportion to the movement of the header. This maintains the front portion of the conditioning unit 80 in close proximity to the header discharge opening 28 and allows the conditioning unit to receive substantially all the crop moving through the discharge opening without significant amounts falling between the conditioning unit and floor plate extension onto the ground.

Once the cutting operation is completed and the windrower 10 is made ready to move to a new location the hydraulic cylinder is extended such that the lift arms 40 lift the header 12 up to its transport position. With reference to FIG. 5, it is seen that as the lower lift arms 40 move upward to bring the header into the transport position, as shown in dotted lines therein, the rollers 114 engage the cam surface causing the conditioning unit to move upwardly until the top thereof is in close proximity to the main frame 14 at which time the rollers 114 are forward of the cam apex. Therefore the conditioning unit is raised quickly and precisely to an upper optimum elevated position for transport. The inverted U-shaped cam supports and stabilizes the conditioning unit 80 while in transport thereby minimizing the load applied to the rear attaching axis 106.

When disconnecting the conditioning unit 80 from the windrower 10, the conditioning unit should be placed on a pallet or some other suitable elevated means such as blocks. To attach the conditioning unit 80, the lower lift arms 40 are raised and the windrower is backed over the elevated conditioning unit. Once rollers 114 come into engagement with the lift arms 40, the lift arms are lowered and the windrower 10 is further backed until the rear pivot axis 106 of the conditioning unit is properly aligned for attachment to the rear mounting brackets 104. After alignment is reached the rear of the conditioning unit is elevated manually or by a jack and the rear mounting brackets 104 are connected to the pivot axis 106.

The terms, "upper," "lower," "forward," "rearward" etc. have been used herein merely for the convenience of the foregoing specification and in the appended claims to describe the conditioner mounting structure and its parts as oriented in the drawings. It is to be understood, however, that these terms are in no way limiting to the invention since the conditioning unit may obviously be disposed in various positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. A crop harvesting machine, comprising in combination: a wheel supported main frame; a header pivotally mounted and supported forwardly of said main frame by a linkage combination including a pair of laterally spaced header lift links extending between said header and said main frame and pivotally connected to each; a pair of guide rails, each disposed inwardly on one of the lift links and extending longitudinally therewith; a conditioning unit, having a pair of conditioning rolls rotatively mounted forwardly therein, mounted in underslung fashion beneath said main frame, rearwardly of a discharge opening in said header, said conditioning unit being pivotally mounted about the rear thereof by a pair of laterally spaced bracket members depending from said main frame, said conditioning unit further including a pair of rollers, one roller mounted on each forward side of the conditioning unit and laterally spaced, aligned with and resting upon the upper surface of said guide rails such that the conditioning unit moves in correspondence with the movement of said header and lift links.

2. In a crop harvesting machine having a wheel supported main frame, a lift linkage mechanism mounted forwardly of said main frame and including a pair of laterally spaced lift arms pivotally connected to said main frame and extending forwardly therefrom, a header supported by said lift mechanism and including a transversely extending reel rotatively mounted therein, cutting means spaced below said reel for cutting the oncoming crop, a discharge opening formed in a rear central portion of the header and having a floor plate extending rearwardly from a lower portion thereof, an auger spaced rearwardly of the reel and adapted to convey the crop material inwardly towards the discharge opening, and a conditioning unit mounted in an underslung fashion beneath said main frame, said conditioning unit including a pair of conditioning rolls spaced in close proximity to the discharge opening for receiving crop material therefrom, the improvement comprising: a mounting structure for mounting said conditioning unit to said main frame such that said conditioning unit moves in proportion to the movement of said header, said improved mounting structure including a pair of laterally spaced bracket members depending downwardly from said main frame and pivotally connected to the rear outer portion of said conditioning unit, guide rails formed along said lift arms, and a pair of rollers each rotatively mounted on an outer front portion of said conditioning unit, said rollers being aligned with said guide rails and adapted to move therealong as said header moves up and down.

3. The harvesting device as recited in claim 2 wherein the improvement further comprises a transversely extending bar fixed to a rear portion of said floor plate and extending over said lift arms and slideable therealong as said lift arms move up and down with said header.

4. The harvesting device as recited in claim 2 wherein said guide rails include inverted V-shaped cam surfaces disposed along a forward portion thereof, said cam surfaces being particularly spaced to engage said rollers when said header is raised to a transport position.

5. A harvesting device comprising in combination: a wheel supported main frame; a lift mechanism mounted forwardly of said main frame and including a pair of laterally spaced lift arms; a header supported by said lift mechanism; and a conditioning unit pivotally mounted about the rear thereof to said main frame and including front moveable support means for moving fore-and-aft along said lift arms such that the front portion of the conditioning unit moves up and down in proportion to the movement of said lift arms and header.

6. The harvesting device as recited in claim 5 wherein said front moveable support means includes a pair of laterally spaced rotatively mounted rollers which extend from each side of the conditioning unit and which are aligned to engage and rest upon said lift arms.

7. A harvesting device as recited in claim 5 wherein guide rails are provided adjacent each lift arm and adapted to support said front moveable support means.

8. A harvesting device as recited in claim 5 wherein each of said lift arms are provided with an elevated cam surface particularly spaced thereon to engage said front support means of said conditioning unit when said header is raised to a transport position such that said conditioning unit is raised to a relatively high position by the engagement of said cam surfaces with said front support means.

9. A harvesting device as recited in claim 8 wherein said cam surfaces are of an inverted V-shape and wherein said front moveable support means includes a pair of rollers rotatively mounted on front portions of said conditioning unit and laterally spaced thereon so as to engage said inverted V-shaped cam surfaces when said header is raised to a transport position.

* * * * *